United States Patent [19]

Backus

[11] Patent Number: 5,396,837
[45] Date of Patent: Mar. 14, 1995

[54] DEVICE FOR REDUCING PEELABLE PRODUCTS SUCH AS POTATOES IN SIZE TO A PREDETERMINED SHAPE

[75] Inventor: Stephanus M. M. Backus, Velden, Netherlands

[73] Assignee: Backus Beheer B.V., Venlo, Netherlands

[21] Appl. No.: 71,634

[22] Filed: Jun. 4, 1993

[30] Foreign Application Priority Data

Jun. 5, 1992 [NL] Netherlands .......................... 9200993

[51] Int. Cl.⁶ .................. A23N 7/02; A47J 17/02; A23P 1/00; B24B 11/00
[52] U.S. Cl. .......................... 99/590; 15/3.13; 15/3.17; 99/585; 99/591; 99/593; 99/623; 99/628
[58] Field of Search .......... 99/567, 584, 585, 590–593, 99/628, 630, 623–627; 15/3.16–3.19, 3.13

[56] References Cited

U.S. PATENT DOCUMENTS

| | | | |
|---|---|---|---|
| 1,327,254 | 1/1920 | Remmers | 99/585 |
| 1,681,920 | 8/1928 | Baccellieri | 99/585 |
| 2,099,224 | 11/1937 | Paxton | 15/3.17 |
| 2,412,565 | 12/1946 | Davis | 15/3.17 X |
| 3,199,134 | 8/1965 | Jones | 15/3.16 |
| 3,392,414 | 7/1968 | Cathcart | 15/3.13 |
| 3,862,682 | 1/1975 | Russell | 15/3.17 |
| 4,048,689 | 9/1977 | Fullenkamp et al. | 15/3.17 |
| 4,608,007 | 8/1986 | Wood | 99/621 |
| 4,773,114 | 9/1988 | Thrasher | 15/3.16 |
| 5,134,928 | 8/1992 | Shiota | 99/621 |

FOREIGN PATENT DOCUMENTS

| | | |
|---|---|---|
| 0077512 | 4/1983 | European Pat. Off. |
| 69821 | 7/1893 | Germany |
| 3426510 | 1/1986 | Germany |
| 407632 | 4/1962 | Switzerland |

*Primary Examiner*—Timothy F. Simone
*Attorney, Agent, or Firm*—Evenson, McKeown, Edwards & Lenahan

[57] ABSTRACT

A device for reducing peelable products such as potatoes in size to a predetermined shape, consisting of at least one pair of mutually adjacent rotatably driven reducing elements, the outer surface of which has at least one constriction such that two oppositely situated constrictions form a passage opening between the elements for the reduced product, wherein the surface of at least one element is provided with a reducing surface, wherein the constriction is formed such that, as seen in top view, the passage opening acquires a predetermined shape in order to obtain a product with an associated revolutional shape, for instance spherical, elliptical or any other composite form.

17 Claims, 1 Drawing Sheet

DEVICE FOR REDUCING PEELABLE PRODUCTS SUCH AS POTATOES IN SIZE TO A PREDETERMINED SHAPE

BACKGROUND AND SUMMARY OF THE INVENTION

The invention relates to a device for reducing peelable products such as potatoes in size to a predetermined shape, consisting of an least one pair of adjacently located rotatably driven reducing elements, the outer surface of which has at least one constriction such that two oppositely situated constrictions form a passage opening between the elements for the reduced product.

A known device is embodied with two rollers arranged parallel adjacent to each other so that a row of mutually adjacent passage openings are formed. By discharging the products, for example potatoes, from the top onto the rotating rollers a quantity of material will be taken off the product for reducing in size by the surface of the elements, whereby this must be reduced to a sphere. In the case of roller elements provided with a grinding layer, such as carborundum, it is known to make the constrictions with circular passage opening. This has been found in practice to be unsatisfactory because the products are ground into an oval-shape as a result of the peripheral velocity differences of the mutually adjacent cross sections of the reducing elements, whereby the product cannot spin round freely, which is a condition for the removal of material on all sides.

The invention has for its object to obviate the above mentioned drawback and provides to this end a device which is distinguished in that the surface of at least one element is provided with a rough grinding surface, wherein the constriction is formed such that, as seen in top view, the passage opening is elongated in axial direction. This elongated passage opening can be oval-shaped, wherein it has been established in tests that the reduced products are perfectly ball or spherical shaped.

The invention further relates to a device for reducing peelable products such as potatoes in size to a predetermined shape, consisting of at least one pair of adjacently located rotatably driven reducing elements, the outer surface of which has at least one constriction such that two oppositely situated constrictions form a passage opening between the elements for the reduced product, wherein it is known to provide each reducing element with a rough grinding surface, for example in the form of carborundum. The drawback to such a surface is that this can easily become congested with material taken off the product, whereby the grinding action deteriorates.

The invention has for its object to obviate the above mentioned drawback in that each reducing element according to the invention is provided with knife-like protrusions for the purpose of peeling the product. Due to the knife-like protrusions a cutting action cakes place on the surface of the product wherein each knife-like protrusion cuts a small piece from the surface of the product.

In an embodiment the passage opening as seen in top view is takes a round form when use is made of the knife-like protrusions.

According to the invention various embodiments of knife-like protrusions can be applied, which preferably extend between two disc-shaped members located at a mutual distance. The knife-like protrusions can for example be peripheral teeth of mutually adjacent blades of different diameter.

Above mentioned and other features of the invention will be elucidated further in the figure description hereinbelow of a number of embodiments. In the drawing:

DETAILED DESCRIPTION OF THE INVENTION

Figure 1:
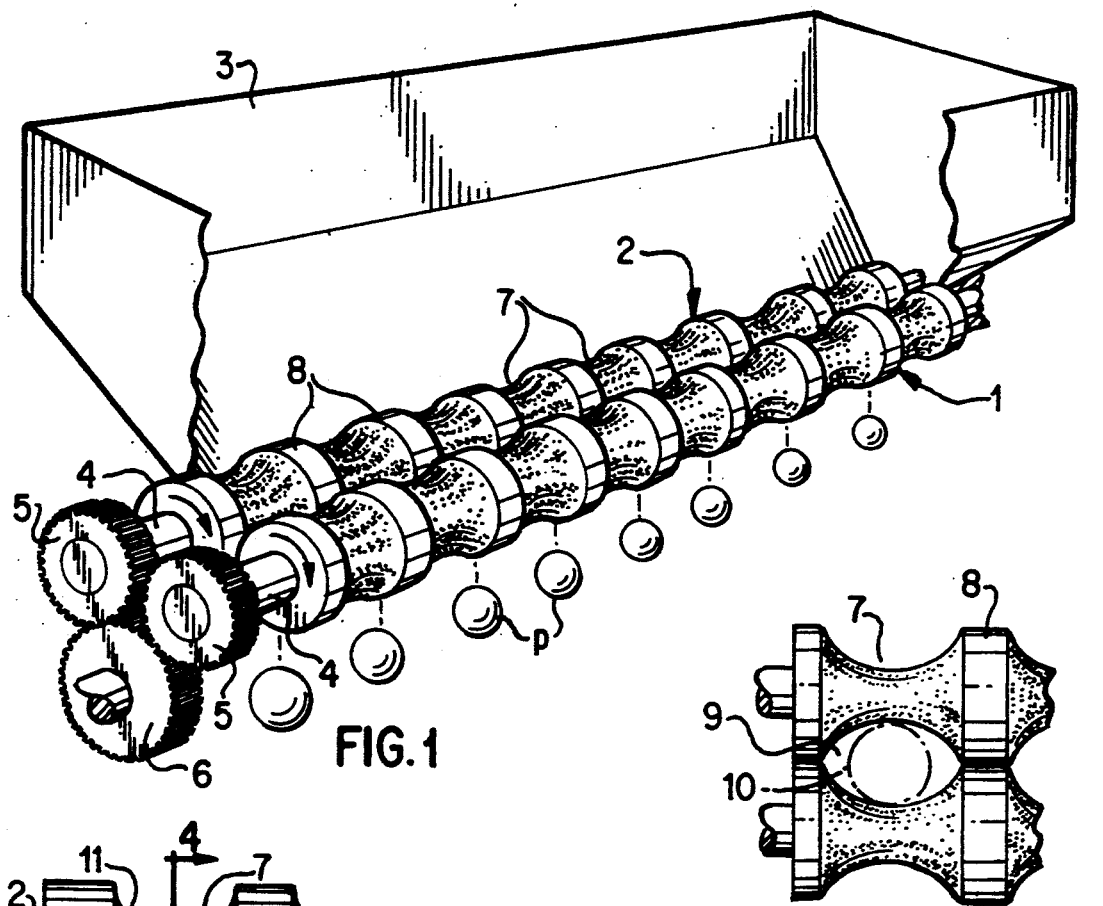
FIG. 1 shows a perspective schematic view of the device according to the invention with partially broken away parts.

The device shown in FIG. 1 comprises two rollers 1, 2 arranged mutually parallel which are suspended rotatably at either end in bearings (not shown) in a randomly chosen frame (not shown). Arranged above the rollers is a supply bin 3 for receiving the products, for example potatoes, for reducing in size. According to the invention the rollers 1, 2 are driven, for which purpose the shafts 4 of the rollers 1, 2 are each provided with a toothed wheel 5 which are both driven by a common toothed wheel 6. The toothed wheel 6 is connected to a drive, for example an electric motor. The diameter of the toothed wheels 5 of the one roller 1 may differ relative to the other roller 2 in order to realize a disparate peripheral velocity of the rollers 1, 2.

Figure 2:
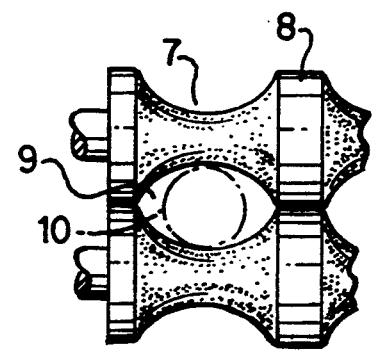
FIG. 2 shows a top view of a part of the rollers according to a first embodiment of the invention.

According to the invention the outer surface of the rollers 1, 2 is in any case provided with at least one constriction 7, see FIG. 2, which constriction connects onto a disc-shaped member 8 which can be repeated along the length of the rollers 1, 2 in order to obtain a number of mutually adjacent constrictions 7. The rollers 1 and 2 are disposed relative to each other such that the constrictions 7 lie mutually opposite so that a continuous opening 9 is formed.

The constriction 7 is formed such that the passage opening 9 is elongated and its largest dimension extends in axial direction of the rollers 1, 2.

The embodiment shown in FIG. 1 and 2 is provided with rollers 1, 2 which are covered at least at the constrictions with a grinding layer, for example carborundum, but it is also possible to provide the peripheral surface of the disc-shaped members 8 with a carborundum layer.

The operation of the above described device is as follows.

When products are arranged in the supply bin 3 and the rollers 1, 2 are caused to rotate, the products will, as a result of the grinding action of The carborundum layer at the constriction 7, be reduced such that the product will also start to spin as a result of the rotating action, preferably with a disparate peripheral velocity of the rollers i, 2, so that as a result the products take on a spherical shape, see P in FIG. 1. As soon as the product has reached the correct dimensions, as designated by the broken line 10 in FIG. 2, it will fall downward through the passage opening 9.

It has been established in tests that the oval-shaped opening 9 produces a round product P since with this constriction shape 7 the product for grinding enjoys a greater freedom of spin and is thereby reduced uniformly in size all round, which results in the round product designated with the line 10. The form 7 is self-centering.

Figure 4:
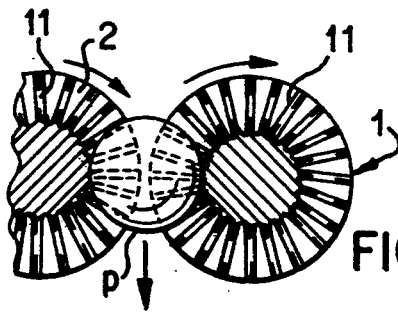
FIGS. 3 and 4 show respectively a top view and an axial standing section corresponding with FIG. 2 of a second embodiment of the roller elements according to the invention, FIGS. 5 and 6 each show a top view corresponding with FIG. 2 of two variants of the roller elements according to the invention.
Figure 3:
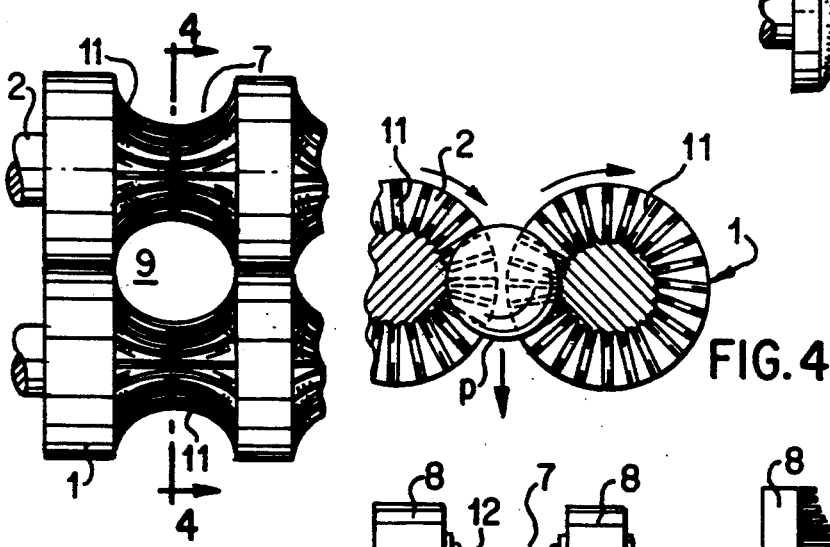

FIGS. 3 and 4 show an embodiment wherein the constriction 7 in the outer surface of the rollers 1, 2 is obtained by arranging circular curved knife strips 11 which extend in radial sense, see FIG. 4. These knife strips protrude above the surface of the material of the roller 1, 2 and thus form blades which cut material from the product for reducing in size. It has been found that in this embodiment the constriction can also be of semi-circular shape so that the passage opening 9 between the rollers 1, 2 can acquire a circular shape. Due to the cutting action a spherical product P is obtained.

Figure 5:
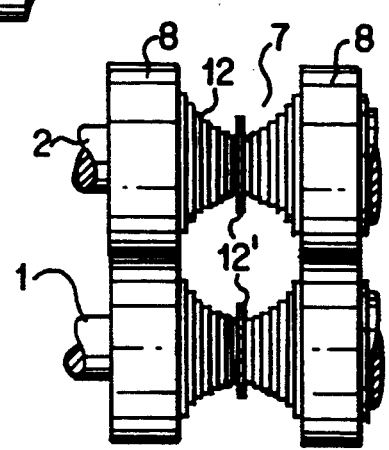

FIG. 5 shows an embodiment wherein between the disc-shaped members 8 a number of saw-blades are disposed mutually adjacent, which saw-blades 12 can be provided on the periphery with blade-like toothings. The diameters of the saw-blades 12 moreover differ mutually such that a constriction form 7 can once again be obtained which can ultimately be circular, oval shaped or even arcuate, see the enlarged middle disc. The material of the product is also subjected to a cutting process here and not a grinding process.

Figure 6:
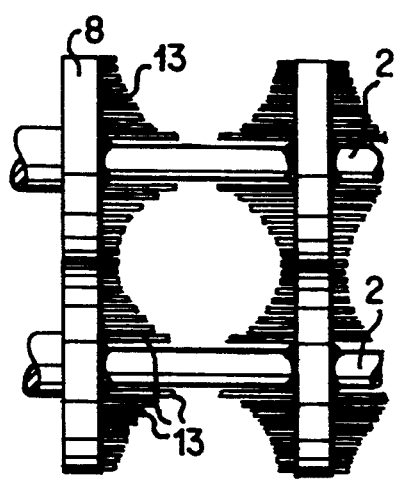

FIG. 6 shows an embodiment wherein a number of pins are disposed in a circular shape on the disc-shaped members 8. The pins lying closest to the rotation shaft 1, 2 are the longest, while the pins decrease in length towards the outer periphery of the discs.

The extremities of the pins 13 are provided with cutting faces which again exert a cutting action on the material of the product. By varying the length of the pins 13 in this manner a circular continuous hole 9 can be obtained as well as an oval-shaped hole as according to FIG. 2.

The invention is not limited to the above described embodiments, and it is possible to deviate from circular or oval-shaped openings in order to obtain any desired product with a revolutional shape, for example an arcuate shape.

I claim:

1. In a device for reducing peelable products such as potatoes in size to a predetermined shape, consisting of at least one pair of mutually adjacent rotatably driven reducing elements, an outer surface of each element having at least one constriction and being oppositely situated from and cooperative with a corresponding outer surface constriction of at least one other of said elements so as to define a constricted passage therebetween through which a product is passable upon being reduced, the improvement comprising:

each reducing element having knife-like protrusions engageable with said product during rotation of said elements, for the purpose of peeling the product.

2. The improvement as in claim 1, and further comprising:

said one and another of said elements having generally parallel axes of rotation, and said axes defining a plane;

an opening of the passage being round as viewed in a direction generally normal to said plane defined by said generally parallel axes.

3. The improvement as in claim 1, and each said element further comprising:

two disc-shaped members spaced apart along an axis of said element, with said knife-like protrusions of said element being disposed between said disc-shaped members.

4. Device as claimed in claim 1, characterized in that the knife-like protrusions are formed by teeth on mutually adjacent saw-blades of different diameter.

5. Device as claimed in claim 1, characterized in that the knife-like protrusions are formed by pins which extend from the disc-shaped member parallel to the rotation shaft and have a decreasing length.

6. The improvement as in claim 1, and further comprising:

a number of said elements disposed mutually adjacent in series along a common axis in order to obtain a roller.

7. The improvement as in claim 6, and further comprising:

means for driving opposed elements in a same rotational sense.

8. The improvement as in claim 7, and further comprising:

means for imparting a disparate peripheral velocity to said opposed elements.

9. Device as claimed in claim 2, characterized in that the knife-like protrusions are formed by teeth on mutually adjacent saw-blades of different diameter.

10. Device as claimed in claim 3, characterized in that the knife-like protrusions are formed by teeth on mutually adjacent saw-blades of different diameter.

11. Device as claimed in claim 2, characterized in that the knife-like protrusions are formed by pins which extend from the disc-shaped member parallel to the rotation shaft and have a decreasing length.

12. Device as claimed in claim 3, characterized in that the knife-like protrusions are formed by pins which extend from the disc-shaped member parallel to the rotation shaft and have a decreasing length.

13. The improvement as in claim 2, and further comprising:

a number of said elements disposed mutually adjacent in series along a common axis in order to obtain a roller.

14. The improvement as in claim 3, and further comprising:

a number of said elements disposed mutually adjacent in series along a common axis in order to obtain a roller.

15. The improvement as in claim 1, and further comprising:

a number of said elements disposed mutually adjacent in series along a common axis in order to obtain a roller.

16. The improvement as in claim 1, and further comprising:

said one and another of said elements having generally parallel axes of rotation, and said axes defining a plane;

an opening of said passage being elongated in said plane.

17. The improvement as in claim 16, and further comprising:

a number of said elements disposed mutually adjacent in series along a common axis in order to obtain a roller.

* * * * *